July 23, 1935.  F. A. BRAUCHT ET AL  2,009,159
MEANS FOR MOUNTING LENSES
Filed April 15, 1932
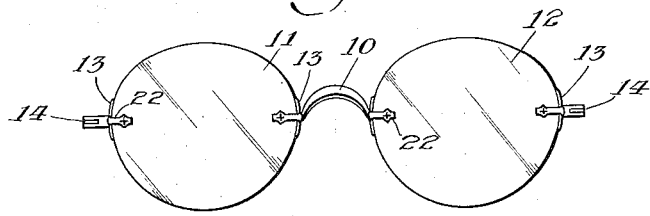
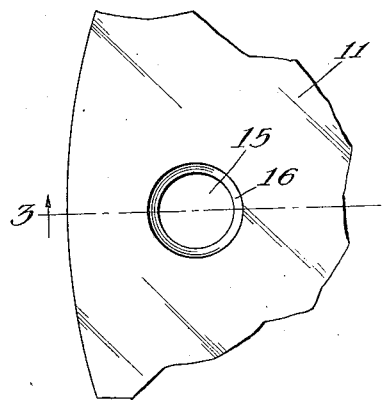
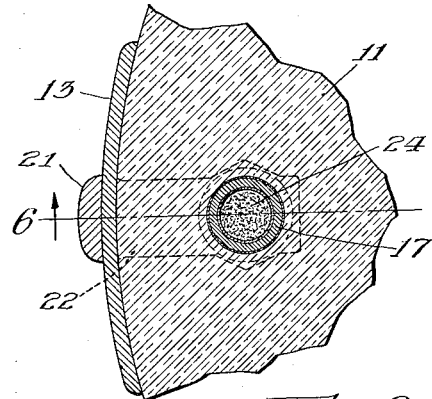
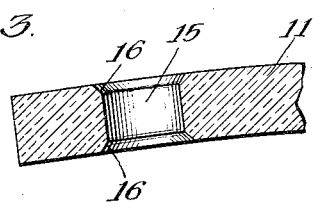
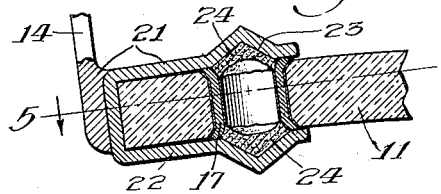
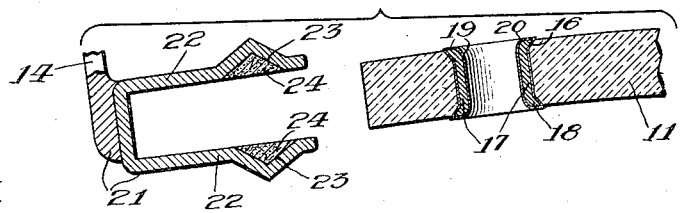
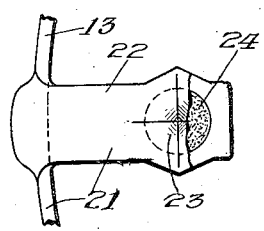
Inventors:
Frederick A. Braucht,
Austin B. Belgard.
By Dyrenforth, Lee, Chritton & Wiles
Attorneys.

Patented July 23, 1935

2,009,159

UNITED STATES PATENT OFFICE 2,009,159

MEANS FOR MOUNTING LENSES

Frederick A. Braucht and Austin B. Belgard, Chicago, Ill., assignors to Belgard-Spero, Inc., a corporation of Delaware Application April 15, 1932, Serial No. 605,524

2 Claims. (Cl. 88—47)

This invention relates particularly to that class of devices known as eye-glasses or spectacles, and more particularly to means for mounting lenses.

The present invention constitutes a modification and improvement of means described in our co-pending application Serial No. 566,734, filed October 3rd, 1931.

In a preferred form, holes are drilled through the lenses at points where they are to be fastened to the bridge piece and to the bows of the spectacles. A tubular metallic rivet, which has previously been given a plating (both inside and out) of tin or soft solder, is seated in each of the drilled holes in the lenses. The bridge piece and bows are each provided with a bifurcated member whose metallic jaws are adapted to slip over the lens and embrace the ends of the rivets. Preferably, the jaws make contact with the ends of the rivets, and the central portion of each jaw is provided with a small pocket which is filled with tin or soft solder and registers with the opening in the end of the rivet. By the application of heat, a rigid joint is formed between the bifurcated member or yoke and the rivet, the solder at the ends of the rivets serving to make the connections between the end portions of the rivet and the metallic jaws, while the solder in the filling fuses with the solder on the inside or lining of the rivet.

The invention is illustrated in a preferred embodiment in the accompanying drawing, in which—

Fig. 1 is a front elevation of a pair of spectacles which embody the invention; Fig. 2, a broken plan view of a portion of an eye-glass having a hole drilled therein; Fig. 3, a sectional view taken as indicated at line 3 of Fig. 2; Fig. 4, a broken sectional view of a lens, rivet and yoke, prior to the application of the latter; Fig. 5, a broken sectional view taken as indicated at line 5 of Fig. 6; Fig. 6, a broken sectional view taken as indicated at line 6 of Fig. 5; and Fig. 7, a broken front elevational view of one of the jaws of the yoke, showing a portion of the solder filling.

In the embodiment illustrated, 10 designates generally a metallic bridge of a pair of spectacles. Secured to the bridge 10 are lenses 11 and 12 which are attached to metallic brackets 13, each bracket having a bow 14 hinged thereto. For the purpose of the present invention, the lenses 11 and 12 may be of identical construction, and as shown in Fig. 2, marginal holes 15 are drilled therein. The end portions of the holes 15, preferably, are bevelled or chamfered as at 16.

A rivet 17, prior to its introduction into the hole 15 is swaged, as indicated at 18, and given a thin coating of tin or solder 19. After being seated in the hole 15 the opposite end 20 is expanded by suitable means, (not shown) so as to fit securely in one of the bevelled portions 16. Preferably, the end portions of the rivet extend a small distance beyond the faces of the lens.

The yoke portions of the bridge 10 and of the brackets 13, indicated generally as 21, may comprise a pair of jaws 22, which may be suitably decorated as shown in Figs. 1 and 7, and are adapted to be slipped over the marginal portion of the rim 11 and the rivet 17. Preferably, the jaws are provided with pockets 23 which contain solder fillings 24. These fillings may be of the same diameter as the opening in the rivet 17, so that the ends 18 and 19 of the rivet will contact with the metal of the jaws 22 rather than with the soldered fillings 24.

After a yoke has been slipped into position so as to embrace the rivet, a small amount of heat may be applied to the yoke 21 by any suitable means such as a soldering iron, open flame, electric current, or the like, and the heat will cause the solder 19 to make an integral member of the jaws and swaged portions of the rivet. Heat will also cause the solder 24 to fuse with the solder 19 on the lining of the rivet as shown in Fig. 6, and thereby further strengthen the connection.

The solder prevents the yokes of the bridge and brackets from being withdrawn from the lens. The rivet 17 may be made of brass or other suitable material and thereby provide a much stronger connection for the jaws of the yoke, than would be provided by solder alone. The rivet is seated snugly in the perforation or hole in the lens and the arms 13, provided on each of the bridge yokes and bracket yokes, serve to prevent the members from being twisted or turned around the axes of the rivets.

The solder employed is preferably of the type described as "soft" solder, as distinguished from "hard" solder, such as "gold solder". The rivets 17 may be described as "tinned" rivets, and the substance employed to coat the rivets is preferably an alloy of tin and lead. The term "solder" is employed in a broad sense in the appended claims.

It will be readily understood that the lenses and the solder-coated or plated tubular rivets may be sold as articles of commerce apart from the bridges and bows, the latter having solder-fillings provided in the pockets of the jaws and adapted to be sold apart from the other members.

The foregoing detailed description has been given for clearness of understanding only, and no unnecessary limitations should be understood therefrom, but the appended claims should be construed as broadly as permissible in view of the prior art.

We claim:

1. A mounting for a lens having an opening extending therethrough, said mounting comprising a pair of spaced arms positioned on opposite surfaces of the lens, said arms being provided with recesses opposite the opening in said lens, a rivet member in said opening and having outwardly flared ends bonded directly to said arms, and enlarged solder heads within said recesses and bonding the arms to the flared ends of said rivet.

2. A mounting for a lens having an opening extending therethrough, said mounting comprising a pair of spaced arms positioned on opposite surfaces of the lens, said arms being provided with recesses opposite the opening in said lens, a solder-plated rivet in said opening and having flared ends contacting and bonded to said arms, and solder heads in said recesses and bonding the arms to the flared ends of said rivet.

AUSTIN B. BELGARD.
FREDERICK A. BRAUCHT.